United States Patent [19]

Yamagishi

[11] Patent Number: 5,680,264
[45] Date of Patent: Oct. 21, 1997

[54] DYNAMICALLY DAMPED MAGNETIC RECORDING CIRCUIT

[75] Inventor: Michinaga Yamagishi, Kawasaki, Japan

[73] Assignee: Fujitsu Limited, Kawasaki, Japan

[21] Appl. No.: 502,837

[22] Filed: Jul. 14, 1995

[30] Foreign Application Priority Data

Nov. 24, 1994 [JP] Japan ................... 6-289508

[51] Int. Cl.$^6$ ................................................. G11B 5/09
[52] U.S. Cl. ................... 360/46; 360/65; 360/68
[58] Field of Search ....................... 360/45, 46, 65, 360/67, 68

[56] References Cited

U.S. PATENT DOCUMENTS

| | | | |
|---|---|---|---|
| 5,331,479 | 7/1994 | Madsen | 360/46 X |
| 5,357,379 | 10/1994 | Gower | 360/46 |
| 5,359,467 | 10/1994 | Nakamura | 360/46 |
| 5,363,249 | 11/1994 | Fitzmorris | 360/46 |

FOREIGN PATENT DOCUMENTS

| | | |
|---|---|---|
| 2-24804 | 1/1990 | Japan . |
| 3-59805 | 3/1991 | Japan . |
| 3187006 | 8/1991 | Japan . |
| 4243003 | 8/1992 | Japan . |

*Primary Examiner*—Aristotelis M. Psitos
*Assistant Examiner*—Alan Faber
*Attorney, Agent, or Firm*—Greer, Burns & Crain, Ltd.

[57] ABSTRACT

Disclosed is a magnetic recording circuit for magnetically recording data on a magnetic record medium with a high density. This magnetic recording circuit comprises a magnetic head and a drive circuit for the magnetic head. This drive circuit includes a variable damping circuit for variably setting a damping factor, of the magnetic head, for controlling a damping characteristic of a record current of the magnetic head. The magnetic recording circuit further comprises a frequency detection circuit for detecting a frequency of the data given to the drive circuit and selecting the damping factor of the variable damping circuit on the detected frequency. The damping factor corresponding to the frequency of the data to be written is set, and hence a resolution required is obtained in a high record frequency range, while a shooting quantity can be reduced in a low record frequency range.

12 Claims, 9 Drawing Sheets

5,680,264

DYNAMICALLY DAMPED MAGNETIC RECORDING CIRCUIT

BACKGROUND OF THE INVENTION

1. Field of the Invention

The present invention relates to a magnetic recording circuit for magnetically recording data on a magnetic recording medium by a magnetic head.

2. Description of the Related Art

A magnetic recording device such as a magnetic disk device performs a magnetic record by flowing an electric current across a magnetic head. In recent years, an improvement of a record density has been a matter of discussion in this magnetic disk device, etc. It is therefore required that a waveform of the record current across the magnetic head be set proper.

In a signal of the record current flowing across the magnetic head, an overshoot or an undershoot is produced at a leading edge (or a trailing edge) of the waveform. It is preferable that an overshoot quantity and an undershoot quantity be as small as possible. It is a general practice for reducing this overshoot quantity that a damping resistor is added to the magnetic head. According to this method, the overshoot quantity is reduced by damping the record current with the damping resistor.

If the damping factor of this magnetic head is increased, the shooting quantity is reduced correspondingly. Hence, this is preferable in terms of reducing the shooting quantity. If the damping factor of the magnetic head is increased, however, an amplitude of the signal waveform is also decreased, resulting in a such a problem that a record magnetic field is weakened. With this problem, another problem arises, wherein a rise of the signal becomes sluggish, and a rise time elongates. Whereas if the damping factor is reduced, the shooting quantity increases. The rise time of the signal is shortened.

Under such circumstances, there has hitherto been set such a damping factor as to minimize the shooting quantity within a range wherein a required resolution is taken at the maximum frequency of write data given to the magnetic head.

In recent years, however, with a demand for actualizing a high-density record, an increment in the maximum frequency of the write data has been desired. As described above, if the maximum frequency of the write data increases, a frequency difference between the maximum frequency and the minimum frequency of the write data becomes large.

Accordingly, if the damping factor is increased, the required resolution can not be taken within a high frequency range of the write data. For this reason, there arises a problem in which the write frequency is hard to enhance. On the other hand, if the damping factor is reduced, a problem is that the shooting quantity augments in a low frequency range of the write data.

SUMMARY OF THE INVENTION

It is a primary object of the present invention to provide a magnetic recording circuit for actualizing a high-density record.

It is another object of the present invention to provide a magnetic recording circuit capable of obtaining a necessary resolution in a high frequency range of write data and reducing a shooting quantity in a low frequency range of the write data.

It is still another object of the present invention to provide a magnetic recording circuit for actualizing the high-density record with a simple construction.

To accomplish the objects given above, according to one aspect of the present invention, a magnetic recording circuit for magnetically recording data on a magnetic record medium comprises a magnetic head for magnetically recording the data on the magnetic record medium and a drive circuit for driving the magnetic head in accordance with the data. The drive circuit includes a variable damping circuit for variably setting a damping factor, of the magnetic head, for controlling a damping characteristic of a record current of the magnetic head. The magnetic recording circuit also comprises a frequency detection circuit, connected to the drive circuit, for detecting a frequency of the data given to the drive circuit and selecting the damping factor of the variable damping circuit in accordance with the detected frequency.

According to the present invention, the damping factor is adaptively switched over in accordance with a record frequency of the data. Therefore, it is possible to obtain a desired resolution and a desired recording level in a high frequency range of the write data. Further, a shooting quantity can be reduced down to a desired value in a low frequency range of the write data. Hence, the maximum frequency of the write data can be enhanced. This makes it possible to actualize the high-density record.

Other features and advantages of the present invention will become readily apparent from the following description taken in conjunction with the accompanying. drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
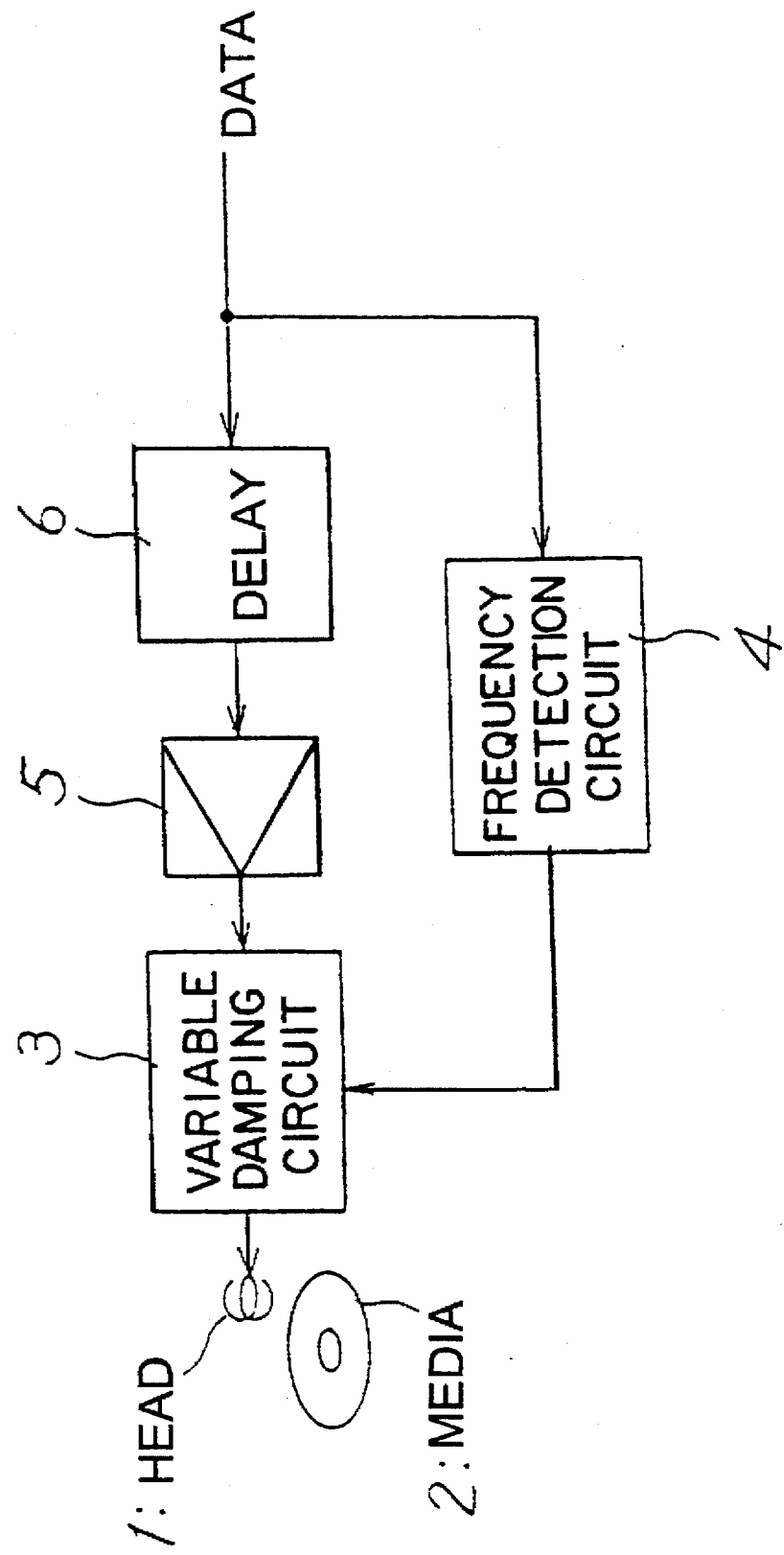
FIG. 1 is a diagram illustrating the principle of the present invention.

FIG. 1 is a diagram illustrating the principle of the present invention.

As illustrated in FIG. 1, a data signal to be recorded is inputted to a delay circuit 6. The delay circuit 6 delays the record data by a time needed for detecting a frequency of the record data. The data signal delayed by the delay circuit 6 is amplified by an amplifier 5. Then, an output of the amplifier 5 is inputted to a variable damping circuit 3. The variable damping circuit 3 is provided in parallel with the magnetic head 1. This variable damping circuit 3 variably sets a damping factor of a recording current of the magnetic head 1. This amplifier 5 and the variable damping circuit 3 constitute a drive circuit for the magnetic head 1.

On the other hand, this record data signal is inputted also to a frequency detection circuit 4. The frequency detection circuit 4 detects a frequency of the record data signal. Then, the frequency detection circuit 4 selects the damping factor of the variable damping circuit 3 in accordance with the detected frequency.

Accordingly, a recording current of the magnetic head 1 is damped based on the selected damping factor. A magnetic record on a magnetic disk 2 by the magnetic head 1 is thereby performed.

Thus, it is possible to set the magnetic head damping factor corresponding to the record frequency of the input data. Therefore, the damping factor is set small at a high record frequency, whereby a resolution required can be obtained. Whereas at a low record frequency, the damping factor is set large, thereby making it possible to restrain a shooting quantity.

Figure 2:
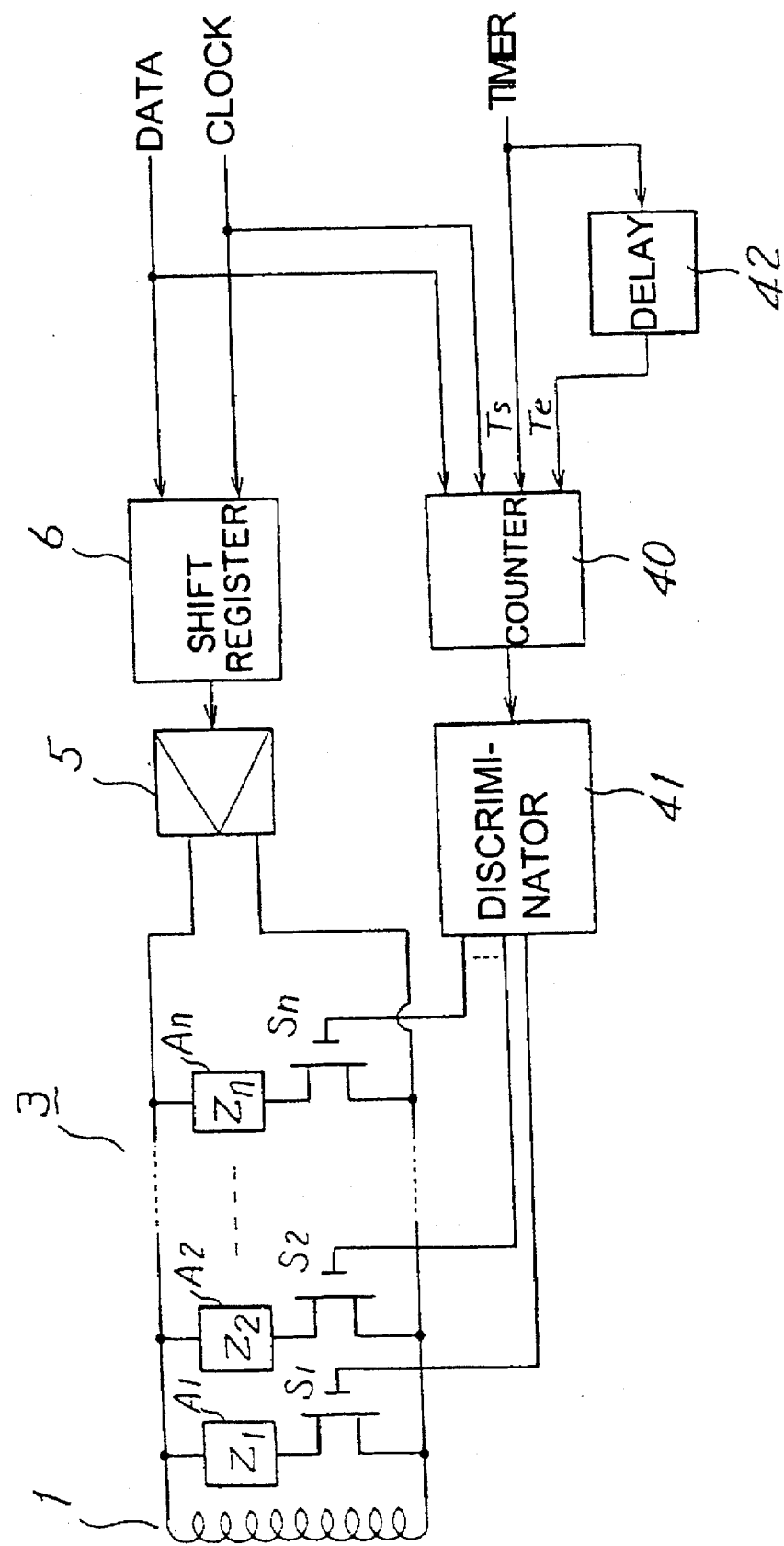
FIG. 2 is a circuit diagram showing one embodiment of the present invention.

FIG. 2 is a circuit diagram in one embodiment of the present invention.

Referring to FIG. 2, the same components as those shown in FIG. 1 are marked with the like numerals. A first delay circuit 6 is constructed of shift registers having a number of bits for one frame. In the case of effecting an 8/9 conversion in a known magnetic record, one frame consists of 9 or 18 bits. The data signal and a clock are inputted to this shift register 6.

The amplifier 5 amplifies the data signal from the shift register 6, thus converting it into a record current. The variable damping circuit 3 includes a plurality of circuits constructed of impedance elements A1–An and switch circuits S1–Sn that are connected in series. These circuits are connected in parallel to the magnetic head 1.

The impedance elements A1–An have impedance values Z1–Zn different from each other. The damping factor can be thus made variable. The impedance elements A1–An are constructed preferably of resistors. Further, the switch circuits S1–Sn are constructed desirably of transistors.

The frequency detection circuit 4 comprises a counter 40, an discrimination circuit 41 and a second delay circuit 42. The counter 40 counts HIGH signals with respect to LOW (0 or −1) and HIGH (1 or +1) of the data signals. The counter 40 starts counting in response to a timer signal Ts transmitted per frame from an unillustrated control circuit.

This timer signal Ts is delayed for a counting period (e.g., a one-frame period) by the second delay circuit 42. The second delay circuit 42 thereby generates a delayed stop signal Te. The second delay circuit 42 is constructed of a timer circuit. The counter 40 stops counting in response to this stop signal Te. Accordingly, the counter 40 counts the data signals during only this counting period.

A count value by the counter 40 during only this counting period indicates a frequency of the data signal. Then, the value of this counter 40 is inputted to the discrimination circuit 41. The discrimination circuit 41 generates a signal for selecting one the switches S1–Sn of the variable damping circuit 3, which corresponds to a value of the counter, i.e., a frequency. This discrimination circuit 41 is constructed of a memory or a decoder for converting a value of the counter 40 into a selection signal.

The operation of this circuit will be explained. The data signal is inputted to the counter 40 subsequently to the timer signal Ts. The counter 40 counts the HIGH signals with respect to LOW (0 or −1) and HIGH (1 or +1) of the data signals. The counter 40 starts counting in response to the timer signal Ts and counts pieces of data assuming the HIGH level of the data signals for one frame.

This timer signal Ts is delayed for a one-frame time by the second delay circuit 42. The second delay circuit 42 generates the delayed stop signal Te. The counter 40 stops counting in response to this stop signal Te. Accordingly, the counter 40 counts the data signals during only one-frame period.

A count value by the counter 40 during one-frame period indicates a one-frame period frequency of the data signal. At the end of this one frame, the discrimination circuit 41 selects a corresponding switch among the switches S1–Sn of the variable impedance circuit 3 in accordance with the value of the counter 40.

Then, the data signal is delayed one frame period by the shift register 6. Therefore, simultaneously when setting up the damping factor with a detection of the frequency of the data for this one-frame period, the data signal is outputted to the amplifier 5. An output of the amplifier 5 is given via the variable impedance circuit 3 to the magnetic head 1. Consequently, the magnetic head 1 is driven corresponding to an item of record data, and a record current flows to the magnetic head 1.

Set at this time in the variable impedance circuit 3 is a damping factor corresponding to the frequency of the record data signal, and, hence, the record current of the magnetic head is damped based on the damping factor corresponding to the frequency of the data signal.

Accordingly, this shift register 6 serving as the first delay circuit is intended to delay the data signal by a time needed for setting up the variable damping circuit 3.

This operation is carried out each time the one-frame data signal is inputted. Thus, the record current is damped based on the damping factor corresponding to the record frequency of the record data signal.

In accordance with this embodiment, the frequency detection circuit 4 involves the use of the counter and can be therefore actualized with a simple construction. Further, the first delay circuit 6 is also constructed of the shift register and can be actualized by use of a simple digital circuit. Further, the start and stop signals for the counter are created from the timer signals, and, hence, the control circuit may output only the timer signal simply indicating a distinction of the one frame. This does not therefore entail a special signal for detecting the frequency.

Figure 3A:
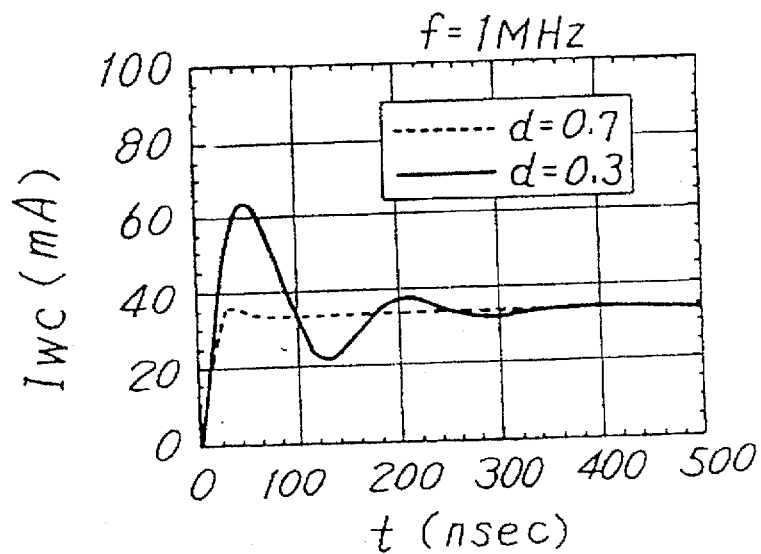
FIG. 3A is a diagram showing a damping characteristic of a record current when a record frequency is 1 MHz.
Figure 3B:
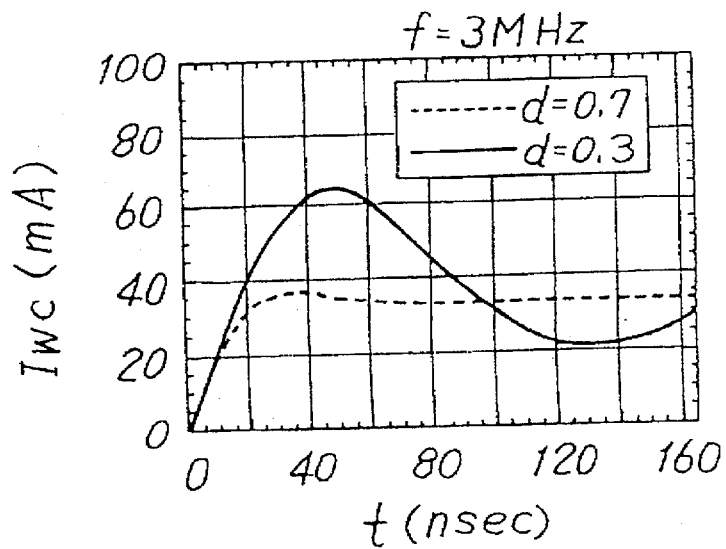
FIG. 3B is a diagram showing the damping characteristic of the record current when the record frequency is 3 MHz.
Figure 4A:
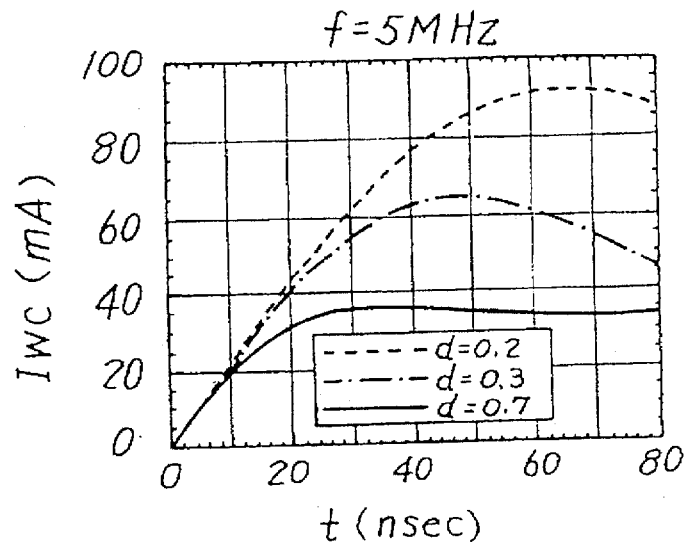
FIG. 4A is a diagram showing a damping characteristic of a record current when a record frequency is 5 MHz.
Figure 4B:
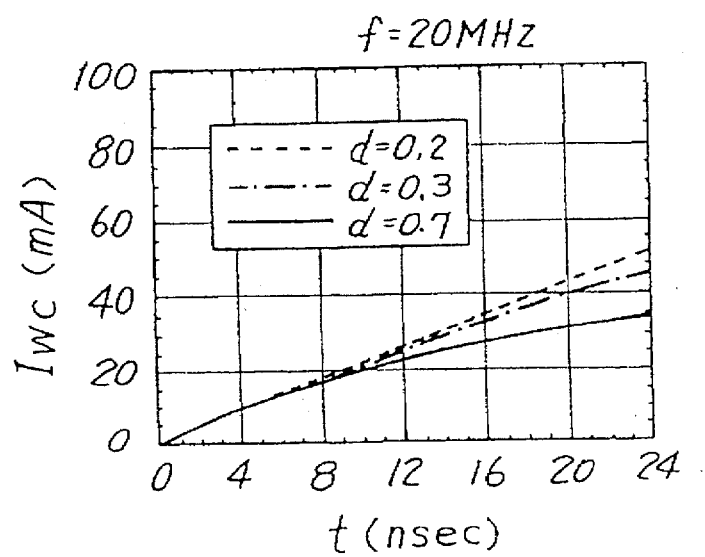
FIG. 4B is a diagram showing the damping characteristic of the record current when the record frequency is 20 MHz.
Figure 5:
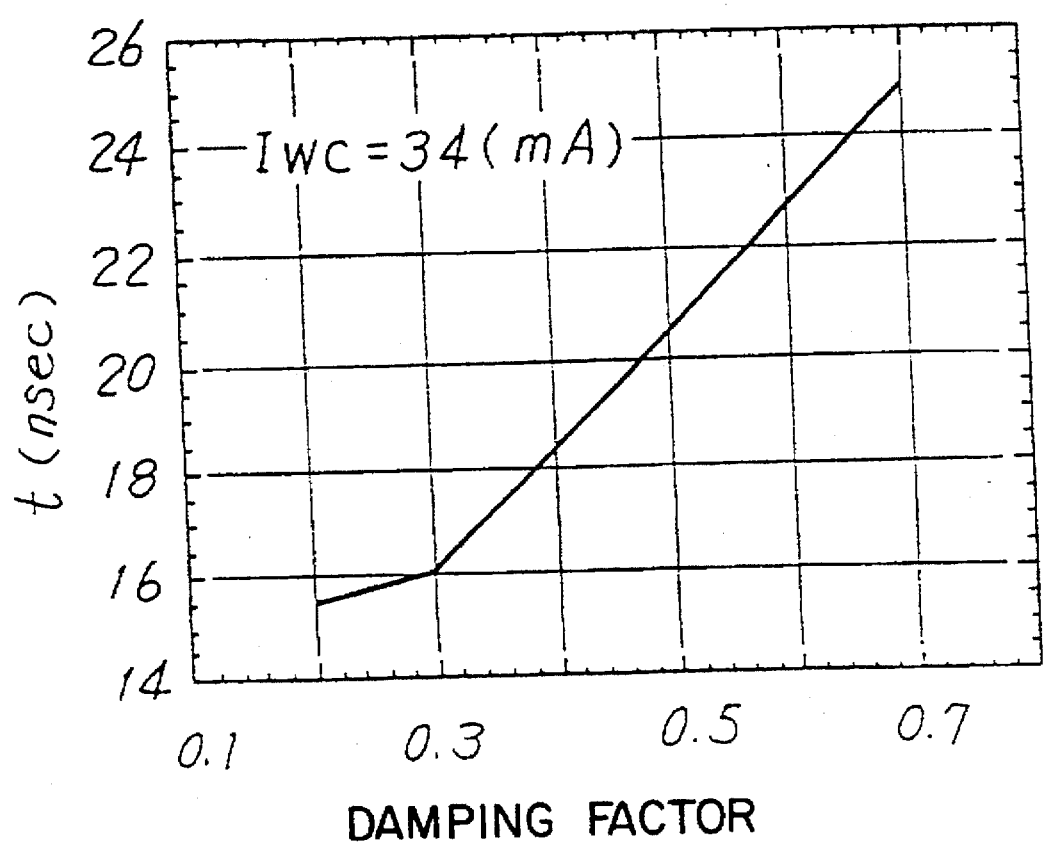
FIG. 5 is a diagram showing a characteristic of a damping factor versus a rise time of an electric current.

FIGS. 3A through 4B are diagrams showing damping characteristics of the record currents when the record frequency is 1 MHz, 3 MHz, 5 MHz and 20 MHz. Further, FIG. 5 is a characteristic diagram of a rise time of the record current versus a damping factor.

FIG. 3A shows a damping characteristic of a record current Iwc when the record frequency is 1 MHz. FIG. 3B shows a damping characteristic of the record current Iwc when the record frequency is 3 MHz. FIG. 4A shows a damping characteristic of the record current Iwc when the record frequency is 5 MHz. FIG. 4B shows a damping characteristic of the record current Iwc when the record frequency is 20 MHz.

Now, an output value of the counter 40 indicates a frequency of the record data signal. Given is an explanation of a case where a value of a damping factor d is small for this record frequency. Explaining it when the value of the damping factor d is, e.g., [0.3], as illustrated in FIGS. 3A to 4B, a shooting quantity of the record current becomes remarkable, and, besides, an amplitude thereof fluctuates largely.

This fluctuation in terms of amplitude turns out a matter-of-fact problem. Restraining this amplitude fluctuation may involve increasing the damping factor d as shown in FIGS. 3A through 4B. For instance, when the value of the damping factor d is set to [0.7], the amplitude fluctuation can be substantially restrained.

When the record frequency increases, however, the rise time decreases, and, besides, the current level is lowered. This relationship will be described with reference to FIG. 5. For example, when the record frequency is 20 MHz, the record current Iwc enough to form a record magnetic field is on the order of 34 mA.

As shown in FIG. 5, in case the record frequency is 20 MHz, a rise time t when the record current is 34 mA is 25 nsec if the value of the damping factor d is [0.7]. Similarly, if the value of the damping factor d is [0.3], the rise time t when the record current 34 mA is 16.1 nsec. Accordingly, a difference therebetween is 9 nsec. That is, a higher-speed and higher-density record is attainable with a smaller value of the damping factor.

Further, as illustrated in FIG. 4B, if the record frequency exceeds 20 MHz, and when the value of the damping factor d is set to [0.7], the record current Iwc reduces before reaching the enough record current value 34 mA described above. Therefore, it follows that if the damping factor increases for the high record frequency, a record current requested is not obtained.

Hence, it is wise to switch over the damping factor in accordance with the record frequency. That is, when the record frequency becomes lower, the damping factor is set larger. Reversely when the record frequency becomes higher, the damping factor is set smaller- Herein, when the record frequency is high, the damping factor is set small, and therefore the shooting quantity of the record current increases. If the record frequency is high, however, the signal is switched OFF before the shooting quantity increases, and, hence, the shooting quantity is not a problem. Accordingly, there is no trouble if the damping factor is reduced in the case of the record frequency being high.

Figure 6:
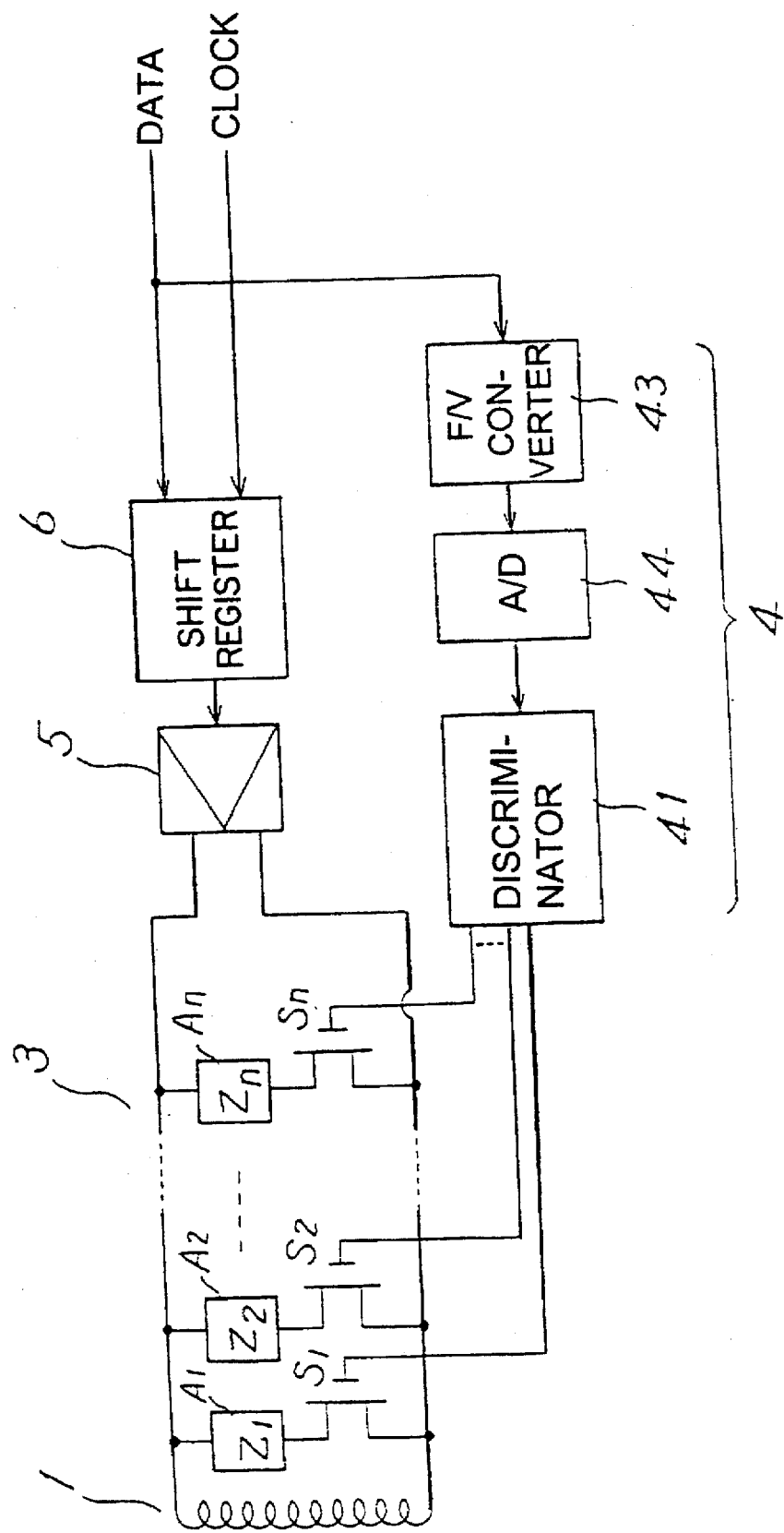
FIG. 6 is a circuit diagram showing a first modified example of the present invention.

FIG. 6 is a circuit diagram illustrating a first modified example of the present invention. Referring to FIG. 6, the same components as those shown in FIG. 2 are marked with the like numerals.

FIG. 6 illustrates the modified example of the frequency detection circuit in the embodiment of FIG. 2. As illustrated in FIG. 6, the frequency detection circuit 4 comprises a frequency/voltage converter 43, an analog/digital converter 44 and the discrimination circuit 41.

As known well, the frequency/voltage converter 43 converts the frequency of the data signal into a voltage. The analog/digital converter 44 converts an analog voltage value of the frequency/voltage converter 43 into a digital value. The discrimination circuit 41 converts this digital value into a switch selection signal of the variable damping circuit 3. That is, the discrimination circuit 41 is intended to select one of the switches S1–Sn of the variable damping circuit 3, which corresponds to the digital value, i.e., the frequency. This discrimination circuit 41 is also constructed of a decoder or a memory.

The operation of this circuit will be described. The frequency/voltage converter 43 converts the frequencies of the data signals within one-frame period into voltages. A voltage output of the frequency/voltage converter 43 is converted into a digital value by the analog/digital converter 44. At the end of this one-frame period, the discrimination circuit 41 selects a corresponding switch among the switches S1–Sn of the variable impedance circuit 3 in accordance with the thus converted digital value.

Then, the data signal is delayed one-frame period by the shift register 6, and a frequency of the record data during this one-frame period is detected. Therefore, simultaneously when the damping factor is set up, the data signal is outputted to the amplifier 5. The electric current thereby flows via the variable impedance circuit 3 to the magnetic head 1. Set at this time in the variable impedance circuit 3 is a damping factor corresponding to the frequency of the record data signal, and, hence, the record current of the magnetic head is damped based on the damping factor corresponding to the frequency of the data signal.

Thus, the frequency detection circuit can be, even when the frequency/voltage converter is used therein, similarly actualized.

Figure 7:
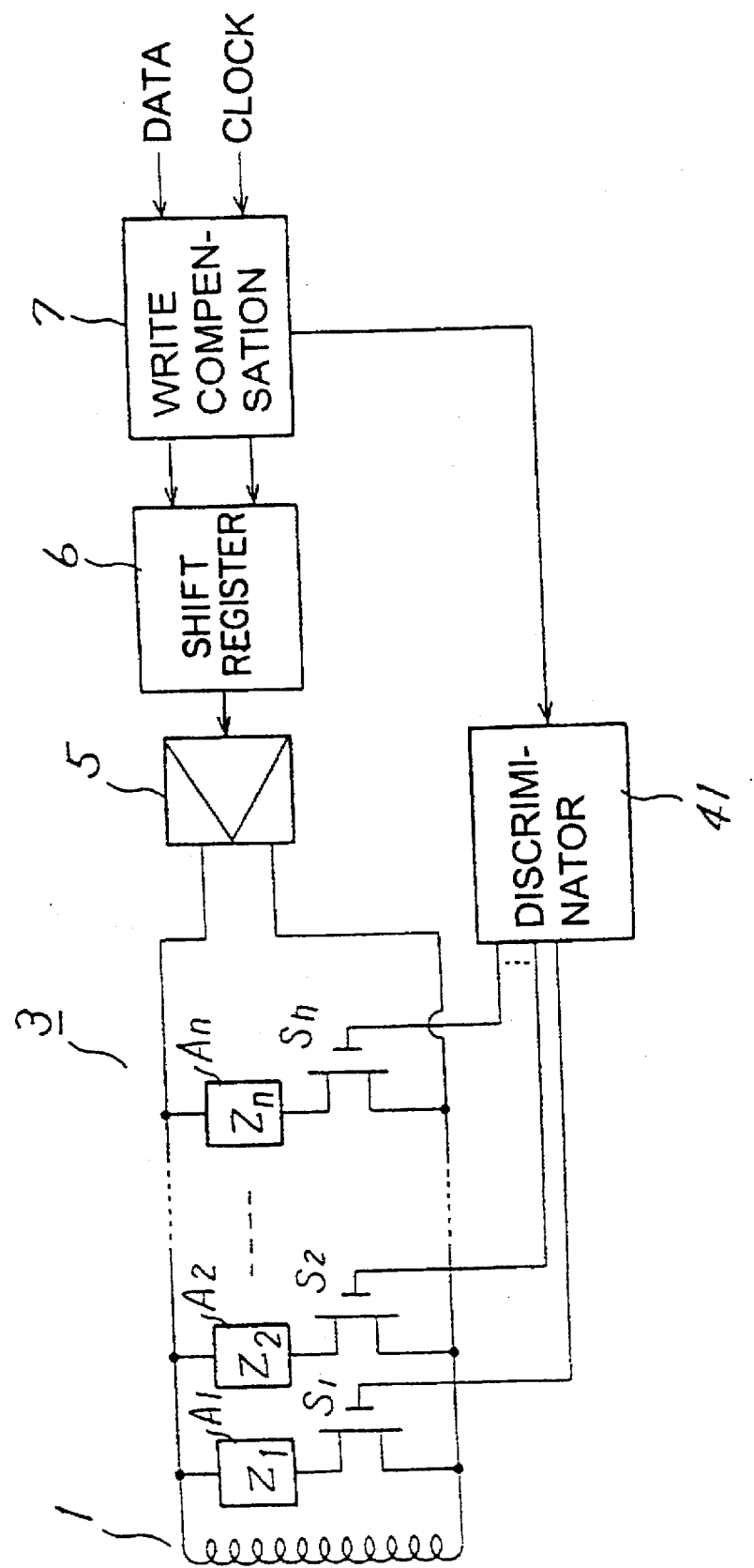
FIG. 7 is a circuit diagram showing a second modified example of the present invention.

FIG. 7 is a circuit diagram showing a second modified example of the present invention. Referring to FIG. 7, the same components as those shown in FIG. 2 are marked with the like numerals.

FIG. 7 shows other modified example of the frequency detection circuit in the embodiment of FIG. 2. As illustrated in FIG. 7, a write compensation circuit 7 is provided anterior to the shift register 6. Then, the frequency detection circuit 4 is constructed of the discrimination circuit 41.

The write compensation circuit 7 is a known circuit for shifting a phase of the record data in accordance with the frequency of the record data in order to average the record frequencies. That is, the write compensation circuit 7 is intended to detect a frequency of the record data and delay the record data in accordance with the detected frequency. This delay quantity corresponds to the frequency.

The discrimination circuit 41 converts this delay quantity into a switch selection signal of the variable damping circuit 3. That is, the discrimination circuit 41 is intended to select one of the switches S1–Sn of the variable damping circuit 3, which corresponds to the delay quantity, i.e., the frequency. This discrimination circuit 41 is also constructed of a decoder or a memory.

The operation of this circuit will be explained. The write compensation circuit 7 delays the record data in accordance with a frequency of the record data signal. The discrimination circuit 41 selects a corresponding switch among the switches S1–Sn of the variable impedance circuit 3 in accordance with the delay quantity.

Then, the data signal is delayed one-frame period by the shift register 6, and a frequency of the record data during this one-frame period is detected. Therefore, simultaneously when the damping factor is set up, the data signal is outputted to the amplifier 5. The electric current thereby flows via the variable impedance circuit 3 to the magnetic head 1. Set at this time in the variable impedance circuit 3 is a damping factor corresponding to the frequency of the record data signal, and, hence, the record current of the magnetic head is damped based on the damping factor corresponding to the frequency of the data signal.

Thus, the frequency detection circuit can be, even when the output of the write compensation circuit is used therein, similarly actualized.

Figure 8:
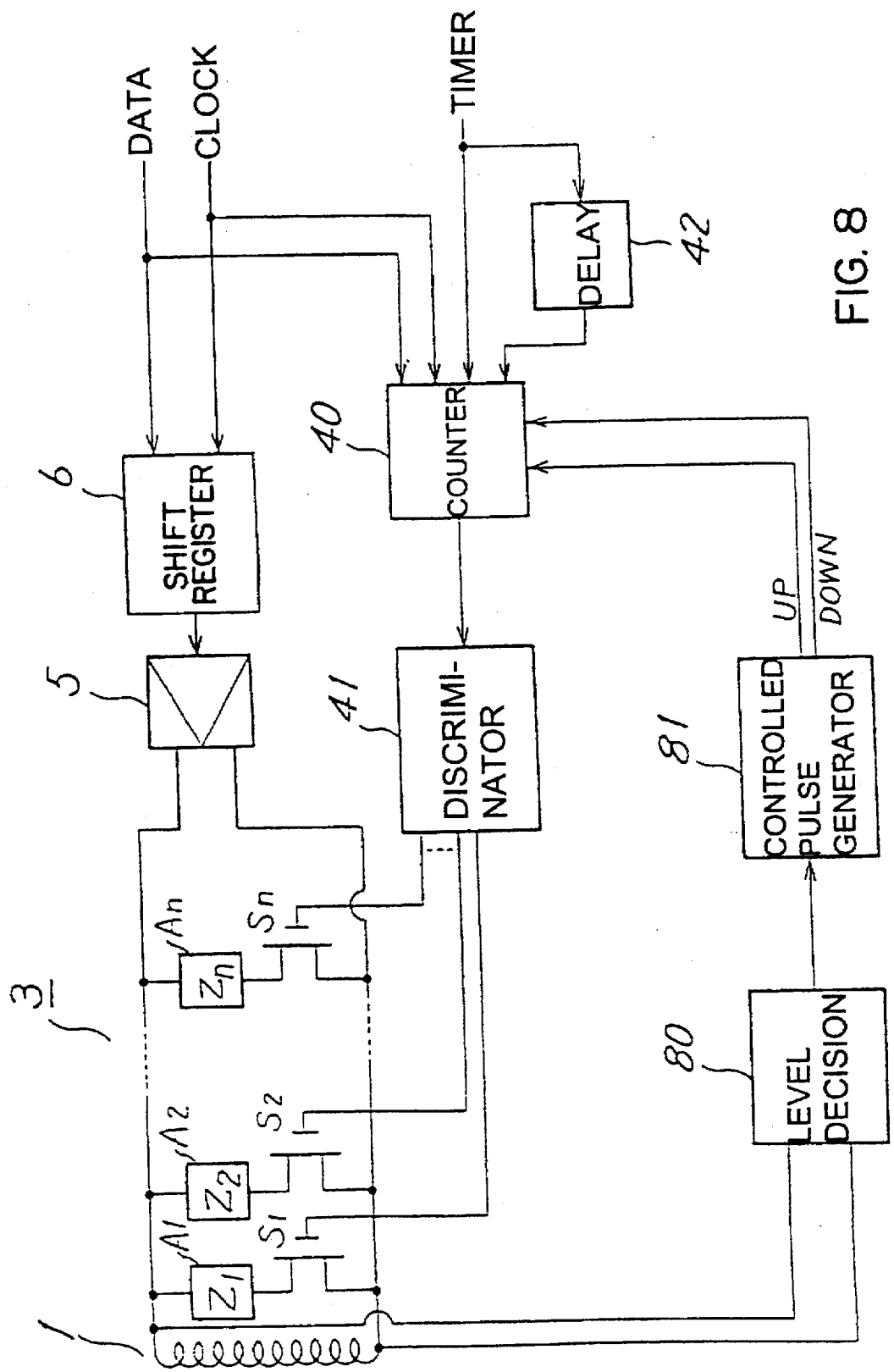
FIG. 8 is a circuit diagram showing third modified example of the present invention.

FIG. 8 is a circuit diagram showing a third modified example of the present invention. Referring to FIG. 8, the same components as those shown in FIG. 2 are marked with the like numerals. In this embodiment, an amplitude compensation circuit is added to the circuit of FIG. 2.

As illustrated in FIG. 8, the amplitude compensation circuit is constructed of a level determining circuit 80 and a control pulse generator 81. The level determining circuit 80 detects a terminal-to-terminal voltage of the magnetic head 1 and measures a level of a current flowing across the magnetic head 1. Then, the level determining circuit 80 determines whether or not the level of the current flowing across the magnetic head 1 has a desired magnitude. The control pulse generator 81 outputs a count-up pulse UP or a count-down pulse DOWN to the counter 40 on the basis of a result of the determination.

In this embodiment, the current is flowed upon determining the damping factor in accordance with the record frequency, and, in addition, the amplitude is compensated. That is, the level of the record current is measured, and the damping factor is further compensated so that the record current level comes to a desired level.

More specifically, in addition to the operation shown in FIG. 2, the level determining circuit 80 measures the current level of the magnetic head 1 and determines whether the measured current level is a desired level or not. Based on a result thereof, the control pulse generator 81 outputs then count-up pulse UP or the count-down pulse DOWN, thus operating the counter 40.

For example, if the measured record current level is smaller than the desired level, the control pulse generator 81 generates the count-down pulse DOWN. A value of the counter 40 is thereby decremented. Consequently, the damping factor increases. The record current level thereby rises. Accordingly, a shortage of the record current can be compensated.

Whereas if the measured current level is larger than the desired level, the control pulse generator 81 generates the count-up pulse UP. The value of the counter 40 is thereby incremented. Consequently, the damping factor reduces. This leads to a decrease in the record current level. It is therefore possible to keep the record current at the desired level and reduce the shooting quantity.

Thus, the damping factor is minutely adjusted by feeding back the actual record current. The record current can be thereby kept at the desired level.

Figure 9:
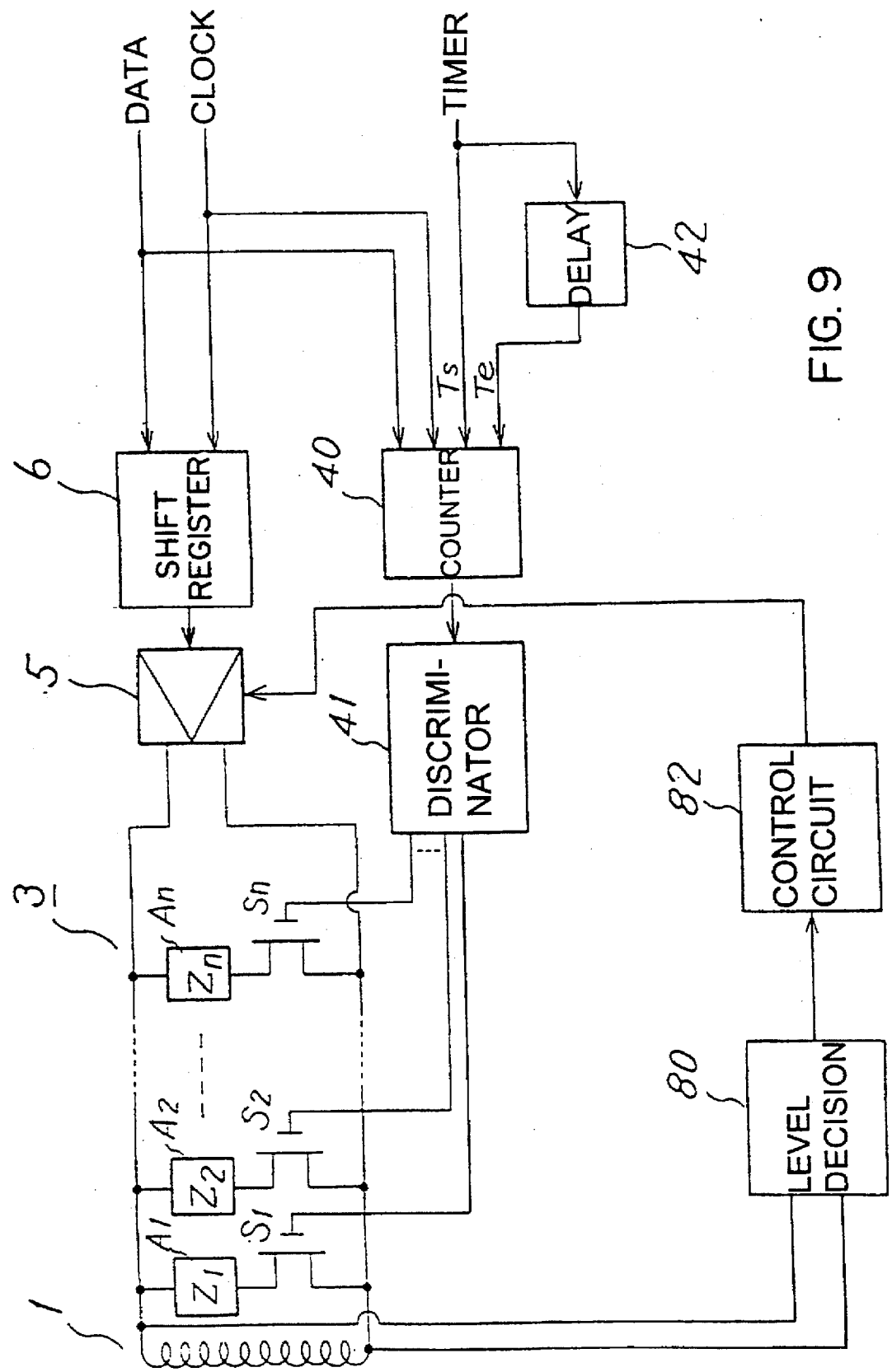
FIG. 9 is a circuit diagram showing a fourth modified example of the present invention.

FIG. 9 is a circuit diagram showing a fourth modified example of the present invention. Referring to FIG. 9, the same components as those shown in FIG. 2 are marked with the like numerals. In this embodiment, other example of the amplitude compensation circuit is added to the circuit of FIG. 2.

As illustrated in FIG. 9, the amplitude compensation circuit is constructed of the level determining circuit 80 and a gain control circuit 82. The level determining circuit 80 detects a terminal-to-terminal voltage of the magnetic head 1 and measures a level of the current flowing across the magnetic head 1. Then, the level determining circuit 80 determines whether or not the level of the current flowing across the magnetic head 1 has a desired magnitude. The gain control circuit 82 controls a gain of the amplifier 5 in accordance with a result of the determination.

In this embodiment, the current is flowed upon determining the damping factor in accordance with the record frequency, and, in addition, the amplitude of the record current is compensated. That is, the level of the record current is measured, and the amplitude gain is compensated so that the current level comes to a desired level.

More specifically, in addition to the operation shown in FIG. 2, the level determining circuit 80 measures the current level of the magnetic head 1 and determines whether the measured current level is a desired level or not. Based on a result thereof, the gain control circuit 82 controls the amplitude gain of the amplifier 5.

For example, if the measured record current level is smaller than the desired level, the gain control B2 enhances the gain of the amplifier 5. An amplification factor of the record data is thereby increased. Consequently, the record current level rises. Accordingly, a shortage of the record current can be compensated.

Whereas if the measured current level is larger than the desired level, the gain control circuit 82 reduces the gain of the amplifier 5. The amplification factor of the record data is thereby decreased. Consequently, the record current level reduces. It is therefore possible to keep the record current at the desired level.

Thus, the record current value is minutely adjusted by feeding back the actual record current. The record current can be thereby kept at the desired level.

In addition to the embodiment discussed above, the present invention is modifiable as below. First, though the example of the write circuit of the magnetic disk device has been explained, the present invention is applicable to a write circuit of a magnetic tape device, etc. Second, the construction of the frequency detection circuit has been exemplified by the counter, the frequency/voltage converter and the write compensation circuit, other circuits for detecting a frequency of the data are also applicable.

The present invention has been discussed so far by way of the embodiments but is modifiable in a variety of forms within the range of the gist of the present invention, and those modifications are not excluded from the scope of the present invention.

As discussed above, according to the present invention, the damping factor is adaptively switched over in accordance with the record frequency, and hence it is possible to obtain a desired resolution and a desired record level in a high record frequency range. Further, the shooting quantity can be reduced down to a desired value in a low record frequency range. The record with a much higher density can be thereby actualized. Further, the easy actualization can be attained with the detection of the record data frequency.

What is claimed is:

1. A magnetic recording circuit for magnetically recording data on a magnetic record medium, comprising:

a magnetic head for magnetically recording the data on said magnetic record medium;

a drive circuit for driving said magnetic head in accordance with the data, said drive circuit including a variable damping circuit for variably setting a damping factor, of said magnetic head, for controlling a damping characteristic of a record current of said magnetic head; and a frequency detection circuit, connected to said drive circuit, for dynamically detecting a frequency of the data according to a data pattern of the string of data given to said drive circuit and dynamically selecting the damping factor of said variable damping circuit in accordance with the detected frequency.

2. The magnetic recording circuit according to claim 1, further comprising a delay circuit, connected to said drive circuit, for delaying and outputting the data to said drive circuit.

3. The magnetic recording circuit according to claim 2, wherein said delay circuit is constructed of a shift register.

4. The magnetic recording circuit according to claim 1, wherein said frequency detection circuit detects a frequency of the data for a one-frame time.

5. The magnetic recording circuit according to claim 1, wherein said drive circuit further includes an amplifier, connected to said variable damping circuit, for converting the data to a current.

6. The magnetic recording circuit according to claim 1, wherein said drive circuit includes:
    an amplifier, connected to said variable damping circuit, for amplifying the data,
    said magnetic recording circuit further comprising:
    a feedback circuit for determining an amplitude level of an electric current flowing across said magnetic head and controlling a gain of said amplifier.

7. A magnetic recording circuit for magnetically recording data on a magnetic record medium, comprising:
    a magnetic head for magnetically recording the data on said magnetic record medium;
    a drive circuit for driving said magnetic head in accordance with the data, said drive circuit including a variable damping circuit for variably setting a damping factor, of said magnetic head, for controlling a damping characteristic of a record current of said magnetic head; and
    a frequency detection circuit, connected to said drive circuit, for detecting a frequency of the data given to said drive circuit and selecting the damping factor of said variable damping circuit in accordance with the detected frequency;
    a counter for counting pieces of data; and
    a discrimination circuit for selecting the damping factor of said variable damping circuit on the basis of an output of said counter.

8. The magnetic recording circuit according to claim 7, wherein said frequency detection circuit further includes:
    a second delay circuit for delaying a timer signal for starting up said counter and creating a stop signal for said counter, said counter being started up by the timer signal but stopped by the stop signal.

9. The magnetic recording circuit according to claim 7, further comprising a feedback circuit for determining an amplitude level of an electric current flowing across said magnetic head and controlling a counting value of said counter.

10. A magnetic recording circuit for magnetically recording data on a magnetic record medium, comprising:
    a magnetic head for magnetically recording the data on said magnetic record medium;
    a drive circuit for driving said magnetic head in accordance with the data, said drive circuit including a variable damping circuit for variably setting a damping factor, of said magnetic head, for controlling a damping characteristic of a record current of said magnetic head; and
    a frequency detection circuit, connected to said drive circuit, for detecting a frequency of the data given to said drive circuit and selecting the damping factor of said variable damping circuit in accordance with the detected frequency;
    a frequency/voltage converter for converting the frequency of the data into a voltage; and
    a discrimination circuit for selecting the damping factor of said variable damping circuit in accordance with an output of said frequency/voltage converter.

11. A magnetic recording circuit for magnetically recording data on a magnetic record medium, comprising:
    a magnetic head for magnetically recording the data on said magnetic record medium;
    a drive circuit for driving said magnetic head in accordance with the data, said drive circuit including a variable damping circuit for variably setting a damping factor, of said magnetic head, for controlling a damping characteristic of a record current of said magnetic head; and
    a frequency detection circuit, connected to said drive circuit, for detecting a frequency of the data given to said drive circuit and selecting the damping factor of said variable damping circuit in accordance with the detected frequency;
    a write compensation circuit for shifting a phase of the data in accordance with the frequency of the data and creating an item of data to be written,
    said frequency detection circuit including:
    a discrimination circuit for selecting the damping factor of said variable damping circuit in accordance with a shift-of-phase quantity of said write compensation circuit.

12. A magnetic recording circuit for magnetically recording data on a magnetic record medium, comprising:
    a magnetic head for magnetically recording the data on said magnetic record medium;
    a drive circuit for driving said magnetic head in accordance with the data, said drive circuit including a variable damping circuit for variably setting a damping factor, of said magnetic head, for controlling a damping characteristic of a record current of said magnetic head; and
    a frequency detection circuit, connected to said drive circuit, for detecting a frequency of the data given to said drive circuit and selecting the damping factor of said variable damping circuit in accordance with the detected frequency;
    a plurality of series circuits each connected in parallel to said magnetic head,
    said plurality of series circuits individually including impedance elements having impedance values different from each other and switch circuits connected in series to said respective impedance elements.

* * * * *

UNITED STATES PATENT AND TRADEMARK OFFICE
CERTIFICATE OF CORRECTION

PATENT NO. : 5,680,264
DATED : October 21, 1997
INVENTOR(S) : Yamagishi

It is certified that error appears in the above-identified patent and that said Letters Patent is hereby corrected as shown below:

Column 2, line 30, after "accompanying" delete "."

Column 5, line 44, delete "smaller-" and insert --smaller. --therefor

Column 8, line 12, delete "B2" and insert --82-- therefor

Signed and Sealed this

First Day of September, 1998

Attest:

Attesting Officer

BRUCE LEHMAN
Commissioner of Patents and Trademarks